(No Model.) 2 Sheets—Sheet 1.

G. W. & S. TAYLOR.
WHEEL CULTIVATOR.

No. 355,953. Patented Jan. 11, 1887.

Witnesses.
L. B. Gardner
J. Davis

Inventors.
Geo. W. Taylor
Sam'l Taylor
per F. A. Lehmann, atty.

N. PETERS, Photo-Lithographer, Washington, D. C.

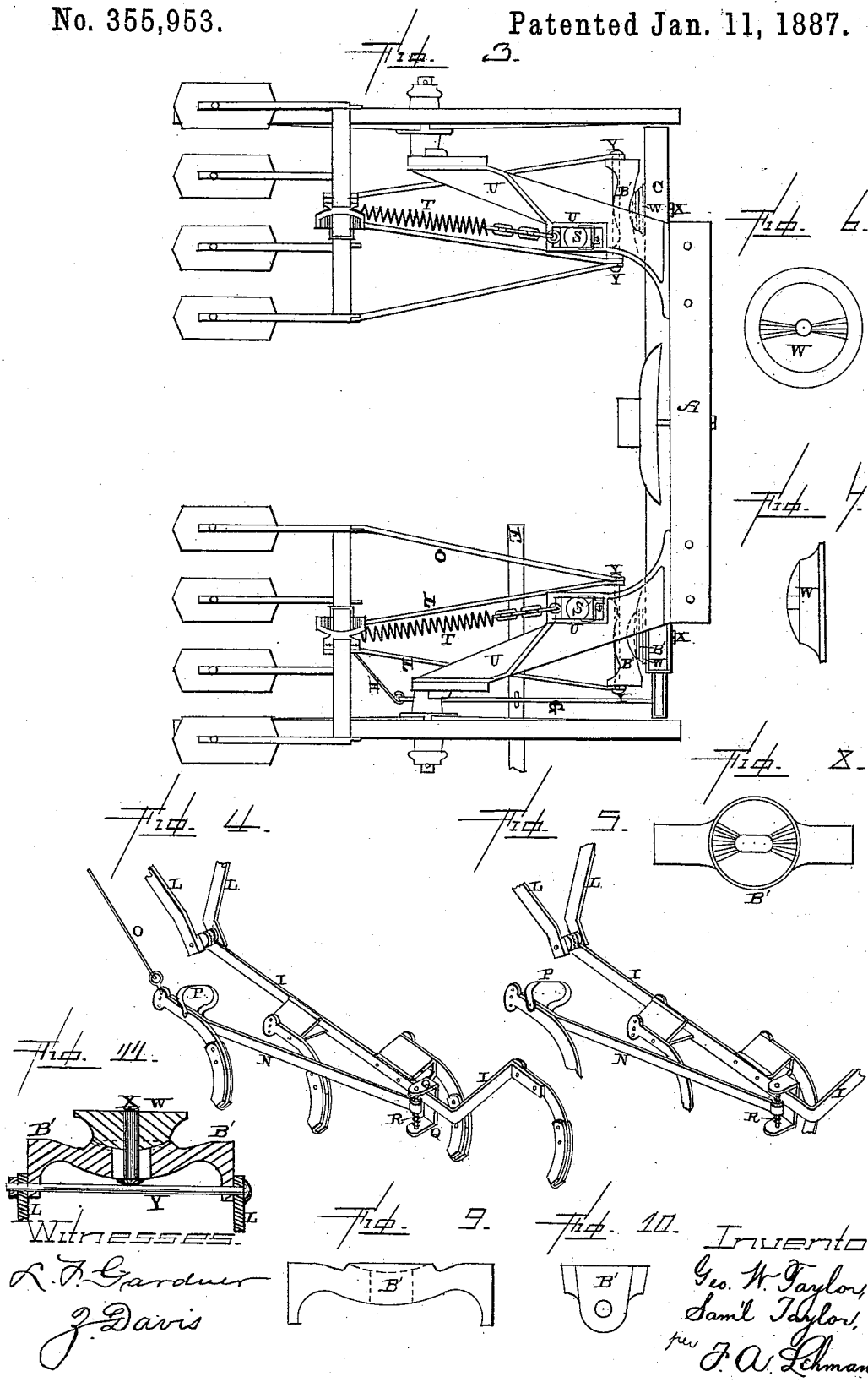

UNITED STATES PATENT OFFICE.

GEORGE W. TAYLOR AND SAMUEL TAYLOR, OF SMYRNA, DELAWARE.

WHEEL-CULTIVATOR.

SPECIFICATION forming part of Letters Patent No. 355,953, dated January 11, 1887.

Application filed October 21, 1886. Serial No. 216,803. (No model.)

*To all whom it may concern:*

Be it known that we, GEORGE W. TAYLOR and SAMUEL TAYLOR, of Smyrna, in the county of Kent and State of Delaware, have invented certain new and useful Improvements in Wheel-Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in wheel-cultivators; and it consists in, first, the combination of the main beam with an independent movable beam, which is loosely connected to the main beam and supported at its front end by a draft-rod; second, the combination of the main beam, a suitable joint, and draft-rods which are connected to the joint, whereby the main beams may be so adjusted that the shovels can be made to run in any desired manner; third, the combination of the main beam, the draft-rods connected thereto, and suitable castings, to which the upper front ends of the draft-rods are connected, the castings being adapted to be adjusted to any suitable angle, so that the shovels can be either inclined toward or away from the plants, or made to run level, as may be desired; fourth, the combination of the main beam, the independent movable beam, and the spring for returning the movable beam to position again after having been moved; fifth, in the arrangement and combination of parts, which will be more fully described hereinafter.

Figure 1:
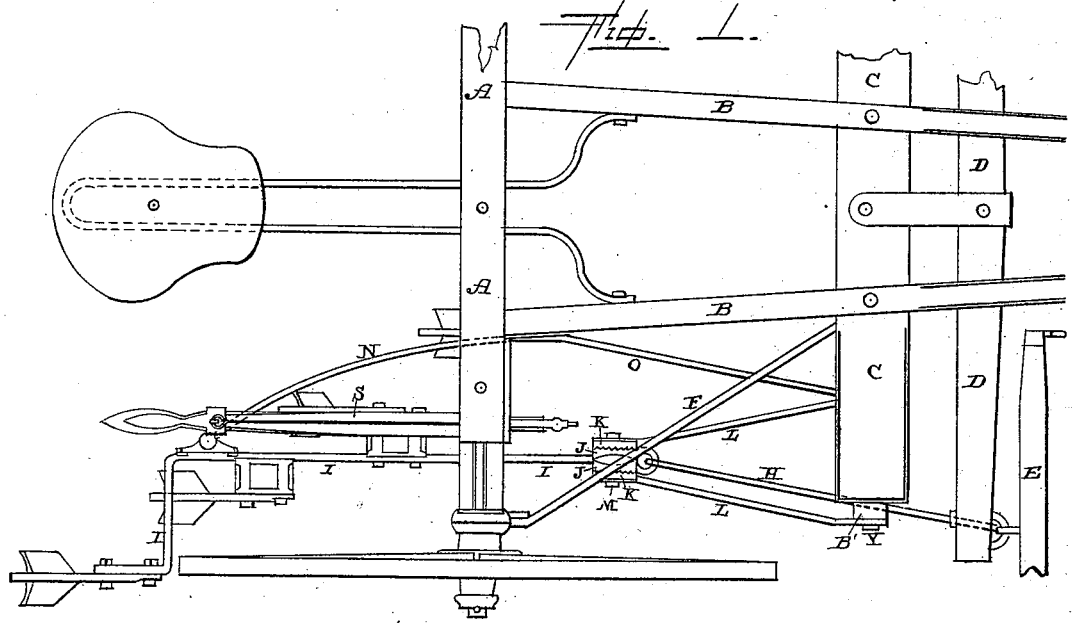
Figure 2:
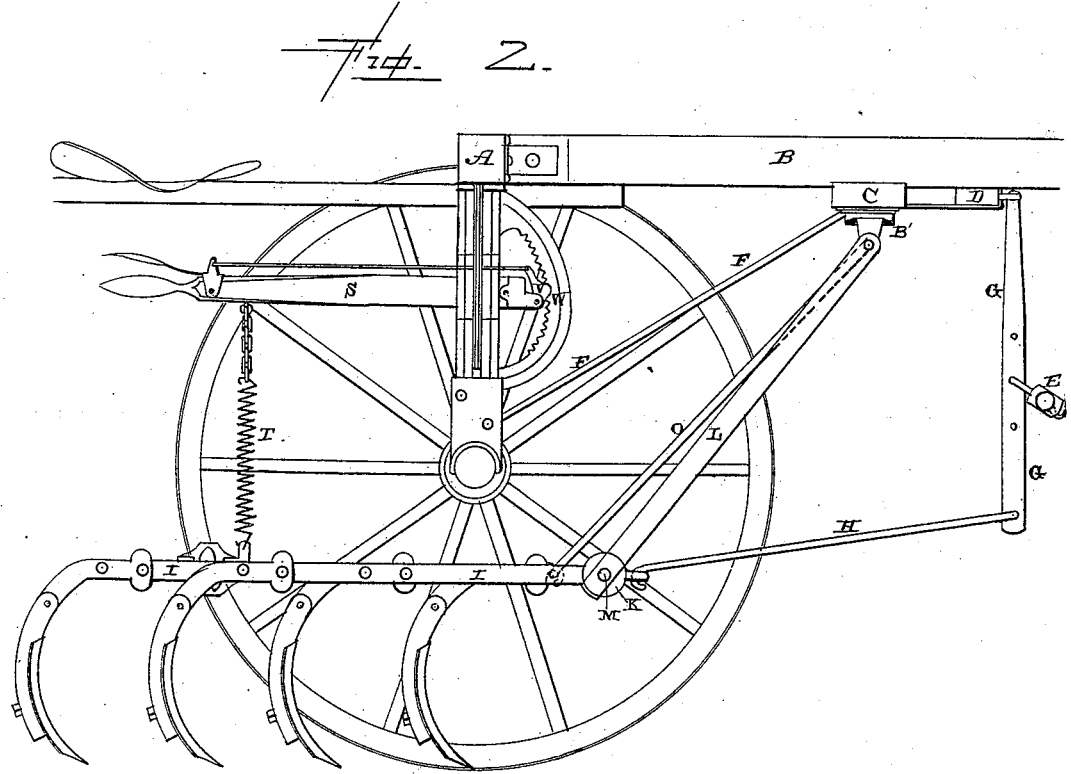

Figure 1 is a plan view of a machine to which our invention is applied. Fig. 2 is a side elevation of the same. Fig. 3 is a rear view. Fig. 4 is a detached perspective of the main beam and the movable beam connected thereto. Figs. 5, 6, 7, 8, 9, 10, and 11 are detail views.

A represents the axle, B the double tongue, C the cross-bar, D the double-tree, and E the single-trees, all of which may be constructed in any desired manner.

To the under side of the cross-bar C are secured the draft-rods F, which are fastened at their rear ends to the tongue-brackets. Extending from the double-tree E are the vertical draft-rods G, to which the single-trees E are fastened. Extending from the lower ends of the draft-rods G are the draft-rods H, which are connected at their rear ends to the main beams I, the rods H being in a direct line of draft, so that they will exert a direct pull upon the front ends of the beams. These beams are provided with eyes upon their front ends to receive the hooked ends of the rods H, as shown. Just in the rear of the eyes upon the front ends of the beams there are applied to opposite sides of the beams I the two brackets J, which are provided with serrations upon their outer sides, and to the outer serrated sides of these blocks J are applied the blocks K, which are also serrated on their inner sides, and which are provided with sockets on their outer sides to receive the lower ends of the draft-rods L. Through the draft-rods, the blocks K J, and the beam I is passed a suitable clamping-bolt, M, by means of which all of these parts are secured together. The blocks K, to which the lower ends of the draft-rods are secured, remain stationary, but the blocks J, which are applied to opposite sides of the beam, together with the beam, are adjusted according as the shovels are made to run shallow or deep, and to adjust the shovels so that they will run perfectly even and true. In order to adjust the beams I the nut on the clamping-bolt M is loosened, the blocks K moved outward from the blocks J sufficiently far to allow the beam and the blocks J to be given the required adjustment, and the parts are clamped rigidly together again.

When two, three, or more shovels are secured to the beam it is a difficult matter to get an adjustment whereby the shovels will run a uniform depth, for the reason that when the shovels move into the ground, being drawn from the head, the shovels or teeth either run too deep on the head or the heel. If too deep on the head, the beams run off from the plants, and if too deep on the heel they draw onto the plants, and it is very laborious to the operator, if not impossible to do good and effective work in either case. Where the beams carry two or more shovels, the operator, in order to not cut the plants, moves the whole beam with its two or more shovels, thereby handling three or four times the amount of earth necessary, which is very objectionable, on account of the labor required by the operator, whether the beams are controlled by hand or foot.

By means of the adjustable joint here shown and described the operator can properly adjust the beams carrying the shovels so as to make them all run at a uniform depth, thereby lessening the side draft and causing the operator to move only one of the shovels, instead of the whole number, thereby lessening the amount of labor and entirely obviating the difficulty above mentioned.

Loosely fastened to the rear part of one of the sides of each of the beams I is an independent movable beam, N, which carries one or more shovels, and which is supported at its front end by means of the draft-rod O. Upon the front end of this beam N is formed a foot-loop, P, by means of which it is moved by the foot of the operator. In order to pivot this beam N to the one I, a suitable casting, Q, is secured to the beam I, down through which is passed a vertical pivotal bolt, upon which the rear end of the beam N turns as upon a pivot. In order to return this beam N to position as soon as it is left free to move after having been moved, a spiral spring, R, is applied to the pivotal bolt, as shown, and which causes the beam to swing back into position as soon as it is left free to move. The springs R are wrapped around the pivotal bolts in such a manner that when the beam N is moved the whole tension of the springs is exerted in returning the beam to position.

In using sulky-cultivators heretofore the operator, in order to avoid cutting out the plants, has had to move sidewise the whole beam with its three or four shovels, which is very laborious and tiresome. By having the beam N, which is independent from the main beam I, the operator has to move only a single shovel on each gang, which is much more easily and quickly moved sidewise than the whole gang can possibly be. The draft-rod is attached to the front end of the movable beam N, to prevent the tooth on this beam from sinking into the ground while in operation.

The main beam I and the independent beam N are so connected that they always move together vertically, and are connected with the operating-lever S by means of a spiral spring, T. The levers S are pivoted in suitable openings which are made through the brackets U, as shown in Fig. 3, and have their front ends to project beyond the brackets sufficiently far to have the pawls V engage with the circular rack-bars W. The pawls are fastened to the operating rods and levers in the usual manner, so that when the levers S are taken hold of to adjust the beams the pawls will be operated, so as to allow the beams to freely move in any desired direction. The brackets are made preferably of the shape shown in Fig. 3, and are secured to the under side of the ends of the axle A, and have the spindles for the wheels secured to or formed as a part of their lower ends. The draft-rods L, connected to the front ends of the beams I, and the rod O, connected to the front end of the independent beam N, are bolted to the ends of the castings, which are secured to the under side of the cross-bar C, and which castings B' have suitable slots made through their centers for the fastening-bolts to pass through, and have made in their tops suitable serrated recesses, so as to receive the corresponding convexed portions of the castings W, which bear against the under side of the cross-bar C. Down through the cross-bar and the castings W and B' are passed suitable clamping-bolts, X, by means of which all of the parts are secured into position. Extending lengthwise through the lower portion of each one of the castings B' is a bolt, Y, to which the upper ends of the three draft-rods are fastened. The concave portion of the casting W is also serrated on opposite sides of its center in a line with the cross-bar C, so as to correspond to the serrations of the casting B', which extend in the same direction. There being a slot through the casting B' for the bolt X to pass through, it will be seen that the casting B' can be moved laterally upon the casting W, and that the casting B' can be placed at an angle to the casting W, so that either one of its ends may be raised or depressed, as desired, and thereby change the inclination of the shovels secured to the beams, as shown in dotted lines in Fig. 3.

The serrations in the socket of the casting W serve to prevent the casting B' from turning around, and the frictional contact caused by the clamping-bolt X holds the casting B' into whatever position it may be adjusted. As shown in dotted lines, the shovels can be turned at an angle, so as to draw the dirt either toward or from the plants, as may be desired. By this construction much labor and care are taken from the operator, for after the shovels have been set properly there is nothing left for him to do, except to guide the shovels as they pass along between the rows.

As shown in Fig. 5, it is not necessary that the independent movable beam N should be supported at its front end by means of the draft-rod O. This beam N may be attached in the manner shown to the main beam at its rear end; but the supporting-rod at its front end may be entirely dispensed with, and then the beam will be guided by the operator's foot entirely. This independent beam will carry one or more teeth or points, and be applied to a straddle-row, walking, riding, or sulky cultivators, whether attached to the front, rear, or elsewhere on the machine. This independent beam carrying one or more teeth or points is wholly under the control of the operator's foot, one beam or tooth being on each side of the row. We do not limit ourselves to the exact location of this independent beam, for it may be applied to the draw-head or elsewhere as well as to the main beam of cultivators.

Having thus described our invention, we claim—

1. The combination of the main beam provided with one or more shovels with an independent beam carrying one or more shovels, and which operates in connection with the main beam, but is controlled independently thereof by means of the driver's foot, substantially as shown.

2. The combination of the main beam provided with two or more shovels with the independent beam carrying one or more shovels loosely connected to the main beam, so as to have a movement independent thereof, and moved by the driver's foot, substantially as described.

3. The combination of the main beam carrying two or more shovels with the independent beam loosely connected thereto and having an independent movement of its own, and a spring for returning the independent beam to position after having been moved by the driver's foot, substantially as set forth.

4. The combination of the main beam carrying two or more shovels, and supported at its front end by suitable draft-rods, with an independent beam loosely connected to the main beam and provided with a draft-rod for supporting it at its front end independently of the main beam, the independent beam being operated by the driver's foot, substantially as specified.

5. The combination of the main beam I, provided with two or more shovels and supported at its front end by suitable draft-rods, with the casting Q, the independent beam N, carrying one or more shovels and provided with a device for the driver's foot, the spring R, which returns the beam M to position, and the draft-rod O, which supports the front end of the beam, the independent beam being operated by the driver's foot, substantially as shown.

6. The combination of the main beam I, suitable draft-rods for supporting its end, and an adjustable joint between the lower ends of the rod and the beam, whereby the beam may be adjusted to run level when at work, substantially as described.

7. The combination of the main beam I, draft-rods L, and the parts J K, provided with serrations, and the clamping-bolt M, substantially as set forth.

8. The combination of the axle, the brackets secured to the under side of its ends and provided with a suitable opening, the levers S, pivoted in the openings, with drag-bar connections to their upper ends and provided with suitable pawls, V, and the racks W, substantially as specified.

9. The combination of the frame of the cultivator with the main beams carrying a suitable number of shovels, the draft-rods, and the casting to which the upper ends of the draft-rods are fastened, the casting being adapted to be turned at an angle, so as to adjust the shovels to throw the earth toward or from the plants, substantially as shown.

10. The combination of the main beams carrying a suitable number of shovels, the draft-rods connected to the front end of the beams, the castings B' W, and the bolts X Y, the castings W being provided with slots and sockets, substantially as described.

In testimony whereof we affix our signatures in presence of two witnesses.

GEO. W. TAYLOR.
SAMUEL TAYLOR.

Witnesses:
ABEL TAYLOR,
HENRY G. BUDD.